United States Patent
Gugel et al.

(10) Patent No.: US 7,619,732 B2
(45) Date of Patent: Nov. 17, 2009

(54) METHOD AND MICROSCOPE FOR HIGH SPATIAL RESOLUTION EXAMINATION OF SAMPLES

(75) Inventors: Hilmar Gugel, Dossenheim (DE); Marcus Dyba, Mannheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 251 days.

(21) Appl. No.: 11/623,703

(22) Filed: Jan. 16, 2007

(65) Prior Publication Data

US 2007/0206276 A1 Sep. 6, 2007

Related U.S. Application Data

(60) Provisional application No. 60/853,448, filed on Oct. 23, 2006.

(30) Foreign Application Priority Data

Mar. 1, 2006 (DE) .................. 10 2006 009 832

(51) Int. Cl.
*G01N 21/64* (2006.01)
*G02B 21/00* (2006.01)

(52) U.S. Cl. ..................................... 356/318

(58) Field of Classification Search .............. 356/317, 356/318, 417
See application file for complete search history.

(56) References Cited

U.S. PATENT DOCUMENTS

| | | |
|---|---|---|
| 5,866,911 A | 2/1999 | Baer |
| 6,667,830 B1 | 12/2003 | Iketaki et al. |
| 6,859,313 B2 | 2/2005 | Iketaki et al. |
| 7,115,885 B2 | 10/2006 | Hell |
| 2001/0045523 A1 | 11/2001 | Baer |
| 2002/0141052 A1 | 10/2002 | Iketaki |

(Continued)

FOREIGN PATENT DOCUMENTS

DE 101 18 355 A1 10/2002

(Continued)

OTHER PUBLICATIONS

U.S. Appl. No. 11/653,446, filed Jan. 16, 2007, Dyba et al.

(Continued)

*Primary Examiner*—F. L Evans
(74) *Attorney, Agent, or Firm*—Foley & Lardner LLP

(57) ABSTRACT

A method and a microscope, in particular a laser scanning fluorescence microscope, for high spatial resolution examination of samples, the sample (1) to be examined comprising a substance that can be repeatedly converted from a first state (Z1, A) into a second state (Z2, B), the first and the second states (Z1, A; Z2, B) differing from one another in at least one optical property, comprising the steps that the substance in a sample region (P) to be recorded is firstly brought into the first state (Z1, A), and that the second state (Z2, B) is induced by means of an optical signal (4), spatially delimited subregions being specifically excluded within the sample region (P) to be recorded, are defined with regard to increasing resolution in any desired direction and with regard to an increased imaging rate by the fact that the optical signal (4) is simultaneously concentrated at a number of focal points, and the focal points are focused into various sites of the sample (1).

45 Claims, 2 Drawing Sheets

U.S. PATENT DOCUMENTS

| | | |
|---|---|---|
| 2007/0025662 A1 | 2/2007 | Gugel |
| 2007/0053059 A1 | 3/2007 | Gugel |
| 2007/0206277 A1* | 9/2007 | Gugel et al. ................ 359/385 |
| 2007/0206278 A1* | 9/2007 | Dyba et al. ................ 359/385 |
| 2007/0268583 A1* | 11/2007 | Dyba et al. ................ 359/578 |

FOREIGN PATENT DOCUMENTS

| | | |
|---|---|---|
| DE | 103 25 459 A1 | 11/2004 |
| DE | 103 25 460 A1 | 11/2004 |
| DE | 103 40 964 A1 | 3/2005 |
| DE | 103 40 965 A1 | 3/2005 |
| EP | 1 584 918 A2 | 10/2005 |

OTHER PUBLICATIONS

U.S. Appl. No. 11/653,444, filed Jan. 16, 2007, Gugel et al.
U.S. Appl. No. 11/623,690, filed Jan. 16, 2007, Dyba et al.

* cited by examiner

METHOD AND MICROSCOPE FOR HIGH SPATIAL RESOLUTION EXAMINATION OF SAMPLES

CROSS-REFERENCE TO RELATED PATENT APPLICATIONS

The right of foreign priority is claimed under 35 U.S.C. § 119(a) based on Federal Republic of Germany Application No. 10 2006 009 832.3, filed Mar. 1, 2006, the entire contents of which, including the specification, drawings, claims and abstract, are incorporated herein by reference. The present application also claims benefit of priority to U.S. Provisional Application Ser. No. 60/853,448, filed Oct. 23, 2006, the entire contents of which are incorporated herein by reference.

BACKGROUND OF THE INVENTION

The invention relates to a method and a microscope, in particular a laser scanning fluorescence microscope, the sample to be examined comprising a substance that can be repeatedly converted from a first state into a second state, the first and the second states differing from one another in at least one optical property, comprising the steps that the substance in a sample region to be recorded is firstly brought into the first state, and that the second state is induced by means of an optical signal, spatially delimited subregions being specifically excluded within the sample region to be recorded.

Methods and microscopes of the type named at the beginning are known from practice. In principle, Abbe's law sets a theoretical limit to the spatial resolution of imaging optical methods owing to the diffraction limit, the diffraction limit being a function of the wavelength of the light used. However, it is possible with the aid of the methods and microscopes discussed here to achieve spatial resolutions that are improved beyond the theoretical diffraction limit known from Abbe.

In the known methods, there are provided for this purpose in the samples to be examined substances that can be repeatedly converted from a first state into a second state, the first and the second states differing from one another in at least one optical property. In the case of most known methods, the first state is a fluorescence-capable state (named state A below), and the second state is a nonfluorescence-capable state (named state B below). After the substance in a sample region to be recorded has been brought into the fluorescence-capable state A by means of a switching signal, state B is induced in spatially limited subregions of the sample region to be recorded by means of an optical signal, and the fluorescence of fluorescence molecules is thereby suppressed. The physical process of fluorescence suppression can be of a very different nature in this case. Thus, for example, stimulated emission from the previously excited state, or an optically induced structural change in the fluorescence molecules is known.

What is decisive is that the transition induced by an optical switching signal from the first into the second state in the sample volume takes place in large regions in a saturated fashion, that is to say completely, and precisely does not take place in at least one subregion of the sample volume in that the optical switching signal is specifically not irradiated there. This effect can be achieved by producing an intensity zero point of the optical signal. No transition into the second state (in general the non-fluorescing state B) takes place at the zero point and in its immediate vicinity, so the first state (in general the fluorescing state A) is retained. Even in the close vicinity of the intensity zero points, a saturation of the transition A→B owing to the optical signal leads in the illuminated regions of the sample region to be recorded to a (virtually) complete transfer into the state B. The stronger the process is driven into saturation, that is to say the more energy that is introduced by the optical signal into the regions around the zero point, the smaller becomes the region with fluorescence molecules in the fluorescence-capable state A, or generally in a "luminous" state. This region can be rendered arbitrarily small in principle as a function of the degree of saturation in the immediate zero point vicinity. It is therefore possible to mark regions of the state A that are arbitrarily much smaller than the smallest regions of an applied optical signal that are possible on the basis of the diffraction limit. If the region of the state A is subsequently read out, for example by irradiating a test signal, the (fluorescence) measuring signal originates from a defined region that can be smaller than is permitted by the diffraction limit. If the sample is scanned point by point in the way described, an image is produced with a resolution that is better than is allowed by the diffraction theory.

Methods of the type described here in the case of which the optical property of fluorescence capability/non-fluorescence capability is used as difference between two states are disclosed, for example, in DE 103 25 459 A1 and DE 103 25 460 A1. In these methods, fluorescence molecules are brought with the aid of an optical signal from a state A (fluorescence-capable) into a state B (nonfluorescence-capable), saturation being achieved in the transition A→B. The regions of the sample that remain in the fluorescence-capable state A result in each case from an intensity minimum, having a zero point, in the irradiated optical signal. The intensity minima are part of an interference pattern. The sample is scanned by displacing the intensity minima in the optical signal, the displacement being effected by shifting the phase of the interfering beams.

SUMMARY OF THE INVENTION

It is disadvantageous in the known methods that the structure of the light distribution in the sample is defined by the interference to a standing wave. This definition is consequently attended by a severe restriction with regard to the possibilities of increasing resolution. Moreover, the imaging rate is limited.

It is now an object of the present invention to specify a method and a microscope of the type mentioned at the beginning, in accordance with which an increase in resolution in any desired directions is achieved using structurally simple and cost effective means. Moreover, the aim is also to enable an increased imaging rate.

According to the invention, the above object is achieved by means of a method having the features of patent claim 1. The method is accordingly configured and developed in such a way that the optical signal is simultaneously concentrated at a number of focal points, and the focal points are focused into various sites of the sample.

The above object is achieved, furthermore, by means of a microscope having the features of patent claim 23. Accordingly, the microscope comprises a device for simultaneously concentrating the optical signals at a number of focal points, it being possible to focus the focal points into various sites of the sample.

It has firstly been realized in the way according to the invention that—by comparison with the production of a standing wave—it is possible to achieve a substantially increased flexibility with regard to the implementation of an improvement in resolution by virtue of the fact that the optical signal is simultaneously concentrated at a number of focal points. These focal points can be focused virtually arbitrarily into various sites of the sample such that a flexible light distribution in the sample is enabled with simple means. In addition, a parallelizing of the scanning of the sample is achieved through the inventive simultaneous focusing of a number of focal points into different sites of the sample to be examined, and this has the consequence, in turn, of significantly increasing the imaging rate.

The method according to the invention and the microscope according to the invention can be applied particularly advantageously in the field of STED (STimulated Emission Depletion) microscopy in conjunction with the up-conversion, as described, for example, in U.S. Pat. No. 6,859,313 B2 or U.S. Pat. No. 6,667,830 B1, and/or in GSD (Ground-State-Depletion) fluorescence microscopy.

It is provided in a particular embodiment that the pupil functions of the individual focal points are modulated. In other words, the light distribution at the individual focal points is modulated. The modulation is carried out in a particularly advantageous way with regard to optimum use of the focal points generated in such a way that at least one intensity zero point is produced at each focal point.

In concrete terms, the modulation could be carried out by means of a phase filter. The phase filter is preferably arranged in a plane that is conjugate with the pupil of an objective through which the sample is illuminated, and that is located between the objective and the plane of the focal points produced. This has the advantage that the light beams of all the focal points generated pass the phase filter such that a single phase filter is sufficient for modulating the optical signal at all the focal points.

Alternatively, or in addition, it is also possible to use a phase filter array, in which case, for example, each focal point could be assigned exactly one phase filter of the phase filter array. All the known phase filters could be used in principle for the modulation. What can be involved, in particular, is, for example, a vapor-deposited structure on a substrate, an achromatic phase filter or a phase filter implemented with the aid of an LCD.

With regard to the particular design of the phase filter, it can be provided that the latter is designed in the form of a semicircle. Such a design is suggested, in particular, for a one-dimensional increase in resolution. A circular embodiment of the phase filter is preferred, in particular, with regard to a three-dimensional increase in resolution. Finally, the phase filter can also be designed as a phase clock, this design being advantageous, in particular, for a two-dimensional increase in resolution.

It can be provided with regard to a particularly simple production of the focal points that a lens arrangement with a number of microlenses is positioned in the beam path. The focal points could be produced in this way for the purpose of a focus array. In the case of the use of a microlens array, the phase filter can, in particular, be arranged in the plane of the lens arrangement or a plane conjugate therewith. In the case of an arrangement in the plane of the lens arrangement, the phase filter could be produced in a particularly simple way by vapor deposition onto the microlenses, for example.

In a further embodiment, it is provided to produce a focus array by means of a number of sequentially arranged beam splitters. The use of a rotating diaphragm, in particular in the form of a Nipkov disk, is also conceivable. In addition, it would be possible alternatively or in addition to use an array of glass fibers and/or holographic elements. Irrespective of the type of devices producing the focal points, the devices are advantageously arranged such that the focal points are produced in the image, in the intermediate image or in a plane conjugate therewith.

In accordance with a particularly preferred embodiment, an arrangement of the phase filter is provided in the case of which the latter is penetrated only by the optical signal. In other words, the arrangement is designed in such a way that the switching signal described at the beginning for converting the substance into the first state, the test signal for reading out the first state, and the measuring signal emanating from the sample are not influenced by the phase filter. This arrangement can be implemented, for example, in the form that the switching signal and/or the test signal and/or the measuring signal are separated from the optical signal upstream of the phase filter. The separation can be performed in this case by one or more dichroic filters or polarization filters, for example. The switching signal and/or the test signal and/or the measuring signal can be reunited with the optical signal downstream of the phase filter, it likewise being possible to use one or more dichroic filters or polarization filters once again to this end. The optical path lengths are preferably selected in this case to be of equal length. In some circumstances, a slightly different optical path length is advantageous when the aim is to compensate chromatic aberrations. It is to be borne in mind in the case of the separation and union of the signals that the measuring signal traverses the structure in the reverse direction to the switching signal and the test signal.

In order to prevent the light of the switching signal, the test signal and/or the measuring signal from being influenced by the phase filter used, it can alternatively be provided that the switching signal and/or the measuring signal are/is coupled into or out of the beam path at a location between the phase filter and the objective. It is preferable to this end to select subregions of the beam path in which the light beams run parallel. It is not possible for the test signal to be coupled in in such a way, since said test signal—like the optical signal—must traverse the device for production.

A suitable movement of the devices producing the focal points can be provided with regard to quick scanning of the sample. In the case of the use of microlenses, lateral movements or rotations of the microlenses, in particular, are conceivable. Alternatively, the sample can be scanned by means of suitable movement of scanning mirrors arranged in the beam path. The scanning is preferably performed in a plane conjugate with the objective pupil, since the structure of the phase filter is stationary in the pupil, and the point spread function (PSF) is consequently spatially invariant.

In a further advantageous way, it is possible with regard to the scanning of the sample to provide a synchronization to the effect that the scanning operation is tuned to the cyclic irradiation of the switching signal, the optical signal, the test signal and to the reading out of the measuring signal. In concrete terms, this means that the substance is firstly brought into the first state in the entire sample volume to be recorded by irradiating the switching signal. Thereupon, the optical signal is irradiated in order to convert the substance into the first state, with the exception of narrowly circumscribed regions around the intensity zero points of the optical signal that have been produced by modulation, as described above. Subsequently thereto, the test signal is irradiated, and the measuring signal emanating from the sample is thereupon read out. Not until then does there follow a scanning step with which the focal points are shifted in the sample with a defined step size and a defined step pattern.

The measuring signal emanating from the sample can be detected by means of a CCD camera or an EMCCD camera, for example. Alternatively, the detector can be designed as a detector array, for example as an APD (Avalanche Photodiode) array.

In a preferred embodiment, the individual focal points produced are respectively assigned defined detector areas, preferably individual camera pixels and/or camera pixel areas, the result being a kind of confocalization. The smaller the assigned detector areas, the better the confocalization. As the sample is being scanned, it is possible for the respective focal points to be assigned other camera pixels or camera pixel areas with each scanning step. The camera is read out after each recording cycle in this case. If the measuring signal traverses the scanning unit (in the form of the device producing the focal points, or in the form of a separate scanning mirror) before it strikes the detector, then it is already descanned, and the focal points are consequently stationary on the detector.

In addition or as an alternative to the described assignment, the individual detector areas can be assigned pinholes for the purpose of attaining a confocalization. Such an arrangement proves to be advantageous in the case, in particular, of use of detectors with a low number of individual detector elements such as, for example, the use of an APD array. The synchronization of pixels and focal points is facilitated when use is made of CCDs and EMCCDs.

Electronic image processing following upon the imaging can be provided with regard to a further increase in resolution. The resolution can be raised still further by using linear or nonlinear deconvolutions.

A modular design of the microscope can be provided with regard to a high level of user friendliness, so that individual components and/or modules can easily be exchanged. Moreover, with regard to the ability to handle with particular ease it can be provided that individual components and/or subassemblies and/or the overall structure are mounted in a housing. In order to facilitate the operability, the optical elements can, additionally, be provided with electrically controlled adjusting means that could, in concrete terms, be motors and/or piezoelements. It is also possible to position in the beam path sensors that detect the beam position and/or focal position. It would then be particularly advantageous to use a feedback loop and control for readjusting the structure automatically and/or keeping it stable.

There are various possibilities of configuring and developing the teaching of the present invention in an advantageous way. To this end, reference is to be made, on the one hand, to the subordinate claims, and, on the other hand, to the subsequent explanation of preferred exemplary embodiments of the method according to the invention and the microscope according to the invention for high spatial resolution examination of samples.

BRIEF DESCRIPTION OF THE DRAWINGS

Preferred refinements and developments of the teaching are also explained in general in conjunction with explanations of the preferred exemplary embodiments and with the aid of the drawing, in which.

DETAILED DESCRIPTION OF THE PREFERRED EMBODIMENTS

Figure 1:
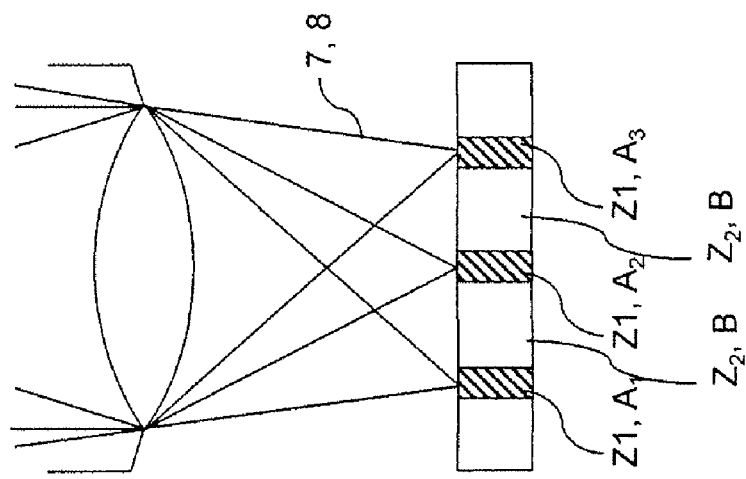
FIG. 1 shows a schematic of a cyclic illumination scheme of a method for high spatial resolution examination of samples.
Figure 1:
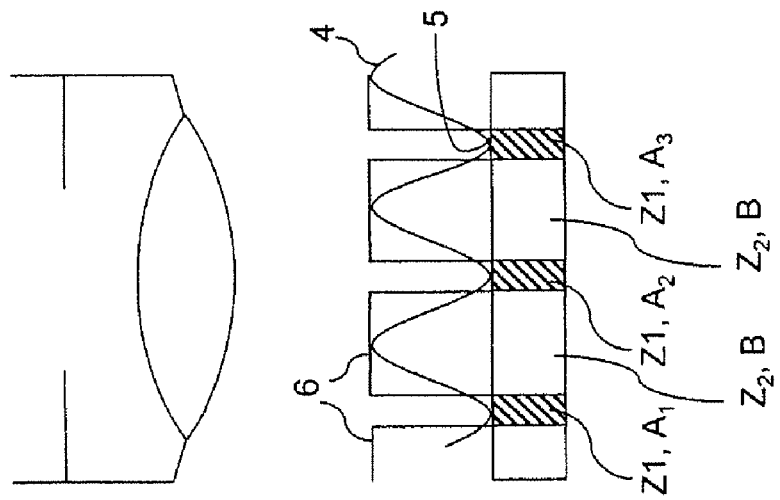
Figure 1:
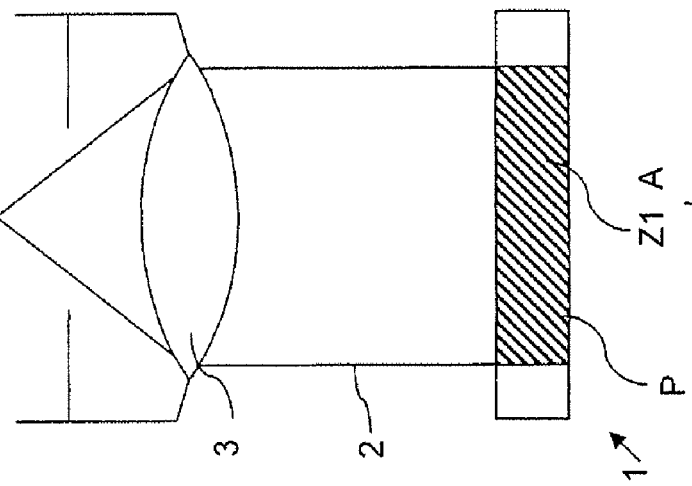

FIG. 1 shows a schematic of a cyclic illumination operation such as is used for high spatial resolution examination of samples beyond the diffraction limited resolving limit. In accordance with FIG. 1a, the first step is to use a switching signal 2 to bring into the first state Z1 in the entire sample space P to be recorded a substance that is provided in the sample 1 and can be converted repeatedly from a first state Z1 into a second state Z2, the first and the second states Z1, Z2 differing from one another in at least one optical property. In the exemplary embodiment illustrated in concrete terms, the first state Z1 is a fluorescing state A, and the second state Z2 is a non-fluorescing state B. In the example illustrated in concrete terms, the substance provided in the sample 1 is a photochromic substance whose molecules are brought into the fluorescence-capable state A by irradiation with light of a first wavelength, the switching signal 2. This happens ideally in that the sample 1 is irradiated in the entire sample space P by illumination through an objective 3 with the aid of the switching signal 2.

In the case of ground state depletion (GSD), the transition into the fluorescence-capable (singlet) state usually takes place spontaneously. The irradiation of optical switching signals is therefore superfluous in this case, there being a need only to take account of waiting times of typically 1 to 100 µs (in part also a little longer).

In a next step—illustrated in FIG. 1b—light of another wavelength, the so-called optical signal 4, is applied to the sample region P to be recorded. This happens in the form of a light structure with defined intensity zero points 5. The optical signal 4 induces in a saturated fashion the transition A→B in all regions 6 illuminated with the light of the optical signal 4. In other words, it is only regions of the substance that are narrowly defined in the immediate vicinity of the intensity zero points 5 that remain in state A. The remaining regions $A_1$, $A_2$, $A_3$, . . . of the substance in state A can be much smaller than the dimensions of the light structure of the optical signal 4 itself, that is to say, in concrete terms, much smaller than diffraction-limited structures. The size of the regions $A_1$, $A_2$, $A_3$, . . . remaining in state A is determined entirely as a function of the quality of the intensity minima 5, and thus of the degree of saturation of the transition A→B that is achieved.

In FIG. 1c is a schematic of the readout operation of state A. To this end, an optical test signal 7 is irradiated into the sample region P to be recorded in such a way that those regions prepared in accordance with FIG. 1b and in which the substance has remained in state A, are recorded. Regions of the substance possibly still existing in state A that lie outside the sample region P to be recorded may not be recorded in this case. The fluorescent light emanating from the substance in state A is detected as measuring signal 8 by a detector (not shown), a unique assignment of the detected measuring signals 8 to the individual regions $A_1$, $A_2$, $A_3$, . . . being undertaken.

The cycle illustrated in FIGS. 1a to c is repeated, the focal points produced (and thus also the intensity zero points 5 generated by phase modulation) being shifted somewhat further upon each repetition. It is possible in this way for the entire sample region to be recorded to be imaged with a resolution in the subdiffraction range.

Figure 2:
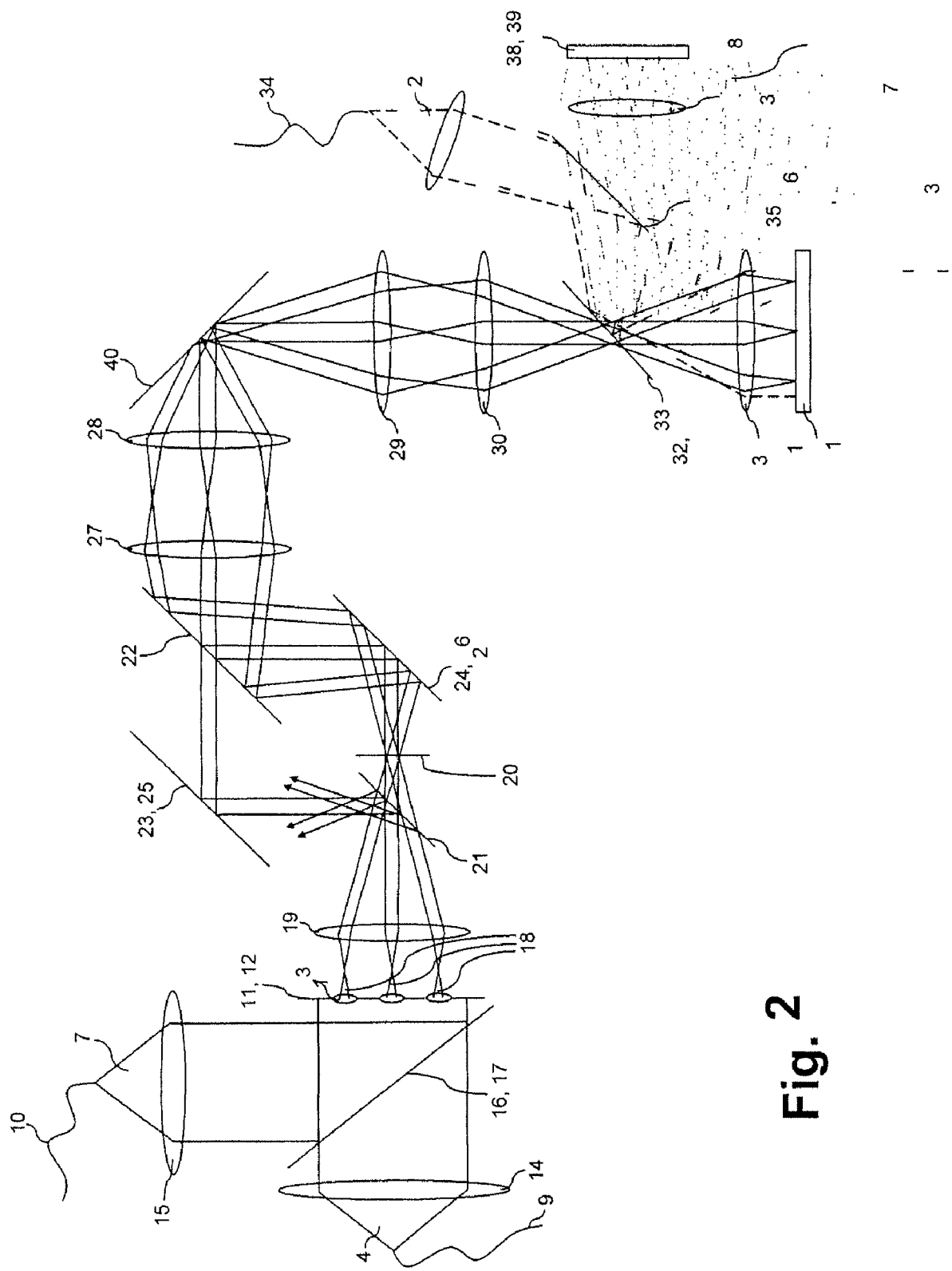
FIG. 2 shows a schematic of an exemplary embodiment of a microscope according to the invention.

FIG. 2 is a schematic of an exemplary embodiment of a microscope according to the invention, in the case of which the optical signal 4 and the test signal 7 are in each case coupled into the beam path via an optical fiber 9, 10. Alternatively, the light sources can also be located directly in the microscope, the light can be coupled in by means of free-beam optics, or the optical signal 4 and the test signal 7 can both be coupled in via a single optical fiber.

A device 11 for producing N focal points is provided, this being designed as a microlens array 12 in the exemplary embodiment illustrated in FIG. 2. The microlens array 12 comprises a total of N lenses 13, of which only three are illustrated for reasons of clarity.

The light, emerging from the fiber 9, of the optical signal 4 is collimated by an optics 14 or chromatically prefocused or defocused, in order to compensate chromatic aberrations of the microlenses 13 of the microlens array 12. The light, emerging from the fiber 10, of the test signal 7 is likewise collimated by an optics 15 or chromatically prefocused or defocused, and this likewise serves to compensate chromatic aberrations of the microlens 13. The light of the optical signal 4 and of the test signal 7 is united at an optical element 17 designed as a dichroic filter 16.

After being united, the light beams traverse the microlens array 12 and are split up in the process into N component beams 18. The component beams 18 are recollimated by means of a downstream optics 19, the optics 19 being arranged at a distance from the microlenses 13 that corresponds to the sum of the focal lengths of the microlenses 13 and the optics 19.

The optical signal 4 traverses a phase filter 20 with the aid of which the pupil function of the optical signal 4 is modulated in such a way that at least one intensity zero point is produced at each focal point. In order to prevent the test signal 7 from also traversing the phase filter 20, there is arranged upstream of the phase filter 20 a dichroic filter 21 with the aid of which the optical signal 4 and the test signal 7 are separated from one another. An AOBS could also be used instead of the dichroic filter 21. The test signal 7 is guided around the phase filter 20 and reunited with the optical signal 4 downstream of the phase filter 20. A dichroic filter 22 serves the purpose of uniting, there being the possibility, in turn, of also using an AOBS here.

Optical elements 23, 24 for beam deflection are arranged in the beam path between the separation and the union of the optical signal 4 and the test signal 7, mirrors 25, 26 being involved here, in concrete terms. The light beams subsequently traverse further optics 27-30 for beam shaping, and are focused into the sample 1 to be examined with the aid of a microscope objective 31.

The switching signal 2 illustrated with dashes and is coupled into the microscope via an optical fiber 34 is united with the optical signal 4 and the test signal 7 at an optical element 32 that is designed as a dichroic filter 33 and is positioned in the beam path between the optics 19 and the objective 31. Alternatively, the light source of the switching signal 2 can also be located directly in the microscope, or the light can be coupled in by means of free-beam optics.

The measuring signal 8 illustrated by dots, which is fluorescent light in the example illustrated, is collected and collimated with the aid of the objective 31. Subsequently, the measuring signal 8 is separated from the remaining beam path at an optical element 36 designed as a dichroic filter 35, and is focused onto a detector 38 by means of a further optical element 37. The detector 38 is designed as a CCD camera 39. In order to attain detection-side confocalization, individual camera pixels or camera pixel areas can be respectively assigned to the focuses produced by means of the individual microlenses 13 (not shown). The smaller these areas, the better the confocalization.

In order to scan the sample 1, the microlenses 13 of the microlens array 12 are moved in a suitable way. The movements can be carried out, in particular, in the form of lateral movements or rotations. The scanning of the sample 1 can also be performed by means of a moving scanning mirror 40 in the beam path.

In order to avoid repetitions, reference may be made to the general part of the description and to the attached patent claims with regard to further advantageous refinements of the method according to the invention and of the microscope according to the invention.

Finally, it may be pointed out expressly that the above described exemplary embodiments serve merely for discussing the teaching claimed, but do not restrict the latter to the exemplary embodiments.

The invention claimed is:

1. A method for high spatial resolution examination of a sample, the sample to be examined comprising a substance that can be repeatedly converted from a first state into a second state, the first and the second states differing from one another in at least one optical property, comprising the steps that the substance in a sample region to be recorded is firstly brought into the first state, and that the second state is induced using an optical signal, spatially delimited subregions being specifically excluded within the sample region to be recorded, wherein the optical signal is simultaneously concentrated at a number of focal points, and the focal points are focused into various sites of the sample.

2. The method as claimed in claim 1, wherein pupil functions of the individual focal points are modulated.

3. The method as claimed in claim 2, wherein the modulation is carried out in such a way that at least one intensity zero point is produced at each focal point.

4. The method as claimed in claim 2, wherein the modulation is carried out using a phase filter.

5. The method as claimed in claim 4, wherein the phase filter is arranged in a plane that is conjugate with the pupil of an objective through which the sample is illuminated, and that is situated between the objective and a plane of the focal points produced.

6. The method as claimed in claim 4, wherein a phase filter array is used as the phase filter.

7. The method as claimed in claim 1, wherein the focal points are produced using a lens arrangement with a number of microlenses.

8. The method as claimed in claim 1, wherein the focal points are produced using a number of sequentially arranged beam splitters.

9. The method as claimed in claim 1, wherein the focal points are produced using a rotating diaphragm, using an array comprising optical fibers and/or using holographic elements.

10. The method as claimed in claim 7, wherein devices producing the focal points are arranged such that the focal points are produced in an image in an intermediate image or in a plane conjugate therewith.

11. The method as claimed in claim 4, wherein a switching signal for converting the substance into the first state, a test signal for reading out the first state, and a measuring signal emanating from the sample are not influenced by the phase filter.

12. The method as claimed in claim 11, wherein the switching signal and/or the test signal and/or the measuring signal are spatially separated from the optical signal upstream of the phase filter.

13. The method as claimed in claim 12, wherein the spatial separation is carried out using one or more dichroic filters and/or polarization filters.

14. The method as claimed in claim 13, wherein the switching signal and/or the measuring signal are/is coupled into or out of a beam path at a location between the phase filter and objective.

15. The method as claimed in claim 7, wherein the sample is scanned using suitable movement of devices producing the focal points.

16. The method as claimed in claim 1, wherein the sample is scanned using suitable movement of a scanning mirror arranged in a beam path.

17. The method as claimed in claim 15, wherein the sample is scanned synchronously with a cyclic irradiation of a switching signal, of the optical signal and of a test signal, and with reading out of a measuring signal.

18. The method as claimed in claim 11, wherein the measuring signal emanating from the sample is detected using a CCD camera or of an EMCCD camera.

19. The method as claimed in claim 11, wherein the measuring signal emanating from the sample is detected using a detector array.

20. The method as claimed in claim 18, wherein the focal points produced are respectively assigned defined detector areas.

21. The method as claimed in claim 20, wherein the detector areas are assigned pinholes.

22. The method as claimed in claim 18, wherein detected images are processed using electronic image processing.

23. A microscope for high spatial resolution examination of a sample, the sample to be examined comprising a substance that can be repeatedly converted from a first state into a second state, the first and the second states differing from one another in at least one optical property, the microscope comprising:
   a controller to provide means for providing a switching signal to bring the substance in a sample region to be recorded into the first state;
   optics to provide an optical signal to induce the second state within the sample region, thereby excluding spatially delimited subregions;
   a device for simultaneously concentrating the optical signal at a number of focal points; and
   optics to focus the focal points at various sites of the sample.

24. The microscope as claimed in claim 23, further comprising a phase filter for modulating pupil functions of the focal points.

25. The microscope as claimed in claim 24, wherein the phase filter is arranged in a plane that is conjugate with a pupil of an objective through which the sample is illuminated, and that is situated between the objective and a plane of the focal points produced.

26. The microscope as claimed in claim 24, wherein the phase filter comprises a phase filter array.

27. The microscope as claimed in claim 24, wherein the phase filter comprises a vapor-deposited structure on a substrate, as an achromatic phase filter or as an LCD.

28. The microscope as claimed in claim 24, wherein the phase filter is in the form of a semicircle.

29. The microscope as claimed in claim 24, wherein the phase filter is in the form of a circle.

30. The microscope as claimed in claim 24, wherein the phase filter comprises a phase clock.

31. The microscope as claimed in claim 23, further comprising a lens arrangement with a number of microlenses for producing the focal points.

32. The microscope as claimed in claim 31, wherein a phase filter is arranged in a plane of the lens arrangement or in a plane conjugate therewith.

33. The microscope as claimed in claim 31, wherein a phase filter comprises a structure vapor-deposited onto the microlenses.

34. The microscope as claimed in claim 23, further comprising a number of sequentially arranged beam splitters for producing the focal points.

35. The microscope as claimed in claim 23, further comprising a rotating diaphragm, an array comprising optical fibers, and/or holographic elements for producing the focal points.

36. The microscope as claimed in claim 23, wherein devices producing the focal points are arranged such that the focal points are produced in an image, in an intermediate image or in a plane conjugate therewith.

37. The microscope as claimed in claim 23, further comprising a modular design.

38. The microscope as claimed in claim 23, wherein individual components and/or subassemblies and/or the overall structure are mounted in a housing.

39. The microscope as claimed in claim 23, further comprising an electronically controlled adjustor.

40. The microscope as claimed in claim 23, further comprising sensors, arranged in a beam path, for detecting a beam position and/or focal position.

41. The microscope as claimed in claim 23, further comprising a control for automatic readjustment.

42. The method of claim 15, wherein the movement of the devices comprises lateral movement or rotation of the microlenses.

43. The method of claim 19, wherein the detector array comprises an APD array.

44. The method of claim 20, wherein the defined detector areas are individual camera pixels and/or camera pixel areas.

45. The microscope of claim 23, comprising a laser scanning fluorescence microscope.

* * * * *